United States Patent

Bindon et al.

[11] Patent Number: 5,924,234
[45] Date of Patent: Jul. 20, 1999

[54] OPTICAL SIGHTING DEVICE

[75] Inventors: Glyn A. J. Bindon, S. Lyon, Mich.; Paul Kennedy, E. Hartford, Conn.

[73] Assignee: Trijicon, Inc., Wixon, Mich.

[21] Appl. No.: 08/975,150

[22] Filed: Nov. 20, 1997

[51] Int. Cl.[6] .................................................. F41G 1/38
[52] U.S. Cl. ................................ 42/101; 33/246; 33/298; 359/353; 359/427; 359/428
[58] Field of Search ................................ 42/101; 33/245, 33/246, 297, 298; 359/353, 399, 400, 424, 427, 428; 356/251, 252

[56] References Cited

U.S. PATENT DOCUMENTS

| | | | |
|---|---|---|---|
| 2,392,122 | 1/1946 | Dake | 33/246 |
| 2,780,130 | 2/1957 | Mauer . | |
| 3,121,163 | 2/1964 | Rickert | 359/428 |
| 3,320,671 | 5/1967 | Rickert et al. | 33/241 |
| 3,556,666 | 1/1971 | Lichtenstern | 33/241 |
| 3,641,676 | 2/1972 | Knutsen et al. . | |
| 3,645,635 | 2/1972 | Steck | 356/252 |
| 3,678,590 | 7/1972 | Hayward | 33/241 |
| 3,880,529 | 4/1975 | Althause et al. | 356/251 |
| 3,897,158 | 7/1975 | Steck | 356/251 |
| 3,905,708 | 9/1975 | Steck | 356/251 |
| 3,932,162 | 1/1976 | Blankenship | 427/167 |
| 3,938,875 | 2/1976 | Ruder . | |
| 3,942,901 | 3/1976 | Ekstrand | 356/251 |
| 4,030,203 | 6/1977 | Ackerman, Jr. | 33/241 |
| 4,057,322 | 11/1977 | Kao . | |
| 4,070,763 | 1/1978 | Carts, Jr. | 33/243 |
| 4,090,778 | 5/1978 | Phillips et al. . | |
| 4,113,346 | 9/1978 | Jackson et al. . | |
| 4,119,362 | 10/1978 | Holtzman . | |
| 4,381,882 | 5/1983 | Sabine . | |
| 4,417,814 | 11/1983 | Doliber | 356/252 |
| 4,576,451 | 3/1986 | Tominaga . | |
| 4,665,662 | 5/1987 | Idan | 33/241 |
| 4,695,126 | 9/1987 | Cook . | |
| 4,738,508 | 4/1988 | Palmquist . | |
| 4,743,765 | 5/1988 | Ekstrand | 250/467.1 |
| 4,764,011 | 8/1988 | Goldstein | 356/251 |
| 4,790,641 | 12/1988 | Halldorsson | 359/399 |
| 4,806,007 | 2/1989 | Bindon | 33/246 |
| 4,877,324 | 10/1989 | Hauri et al. | 356/251 |
| 4,968,109 | 11/1990 | Tanaka . | |
| 4,998,795 | 3/1991 | Bowen et al. . | |
| 5,013,110 | 5/1991 | Marazzi . | |
| 5,054,225 | 10/1991 | Giuffre et al. | 42/101 |
| 5,062,682 | 11/1991 | Marazzi . | |
| 5,084,780 | 1/1992 | Phillips | 359/350 |
| 5,088,804 | 2/1992 | Grinderslev | 385/81 |
| 5,223,650 | 6/1993 | Finn | 42/101 |
| 5,301,250 | 4/1994 | Cheng | 385/76 |
| 5,333,218 | 7/1994 | Ortiz, Jr. | 385/76 |
| 5,345,323 | 9/1994 | Basavanhally et al. | 385/59 |
| 5,351,327 | 9/1994 | Lurie et al. | 385/78 |
| 5,359,800 | 11/1994 | Fisher et al. | 42/103 |
| 5,426,715 | 6/1995 | Moisson et al. | 385/76 |
| 5,448,662 | 9/1995 | Kittell et al. | 385/75 |
| 5,452,131 | 9/1995 | Jorlov | 359/638 |
| 5,459,806 | 10/1995 | Hultermans | 385/85 |
| 5,465,314 | 11/1995 | Jie et al. | 385/85 |
| 5,500,911 | 3/1996 | Roff | 385/76 |
| 5,653,034 | 8/1997 | Bindon | 33/241 |

FOREIGN PATENT DOCUMENTS

| | | |
|---|---|---|
| 0259837 | 3/1988 | European Pat. Off. . |
| 4226203A1 | 2/1994 | Germany . |
| 64-29827 | 1/1989 | Japan . |
| 318892 | 3/1957 | Switzerland . |
| 2233785 | 1/1991 | United Kingdom . |
| WO97/00419 | 1/1997 | WIPO . |

*Primary Examiner*—Stephen M. Johnson
*Attorney, Agent, or Firm*—Harness, Dickey & Pierce, P.L.C.

[57] ABSTRACT

An aiming post for an optical sighting device providing an illuminated aiming mark defined by surfaces forming a generally sharp peak or point and also a construction for providing ambient light illumination for the aiming mark in which the intensity is selectively variable by the operator.

32 Claims, 5 Drawing Sheets

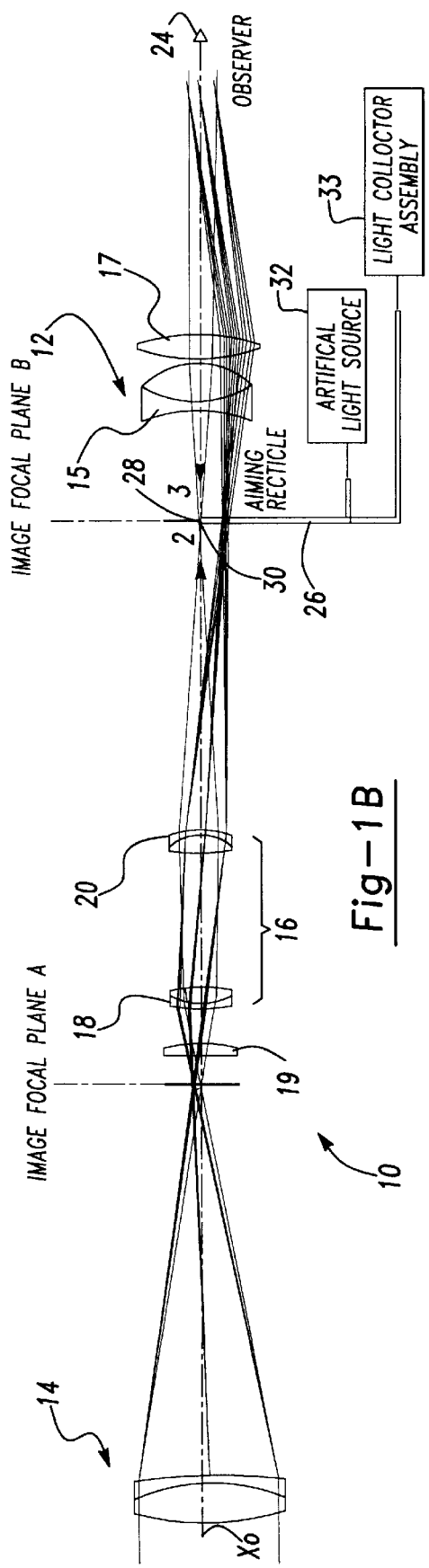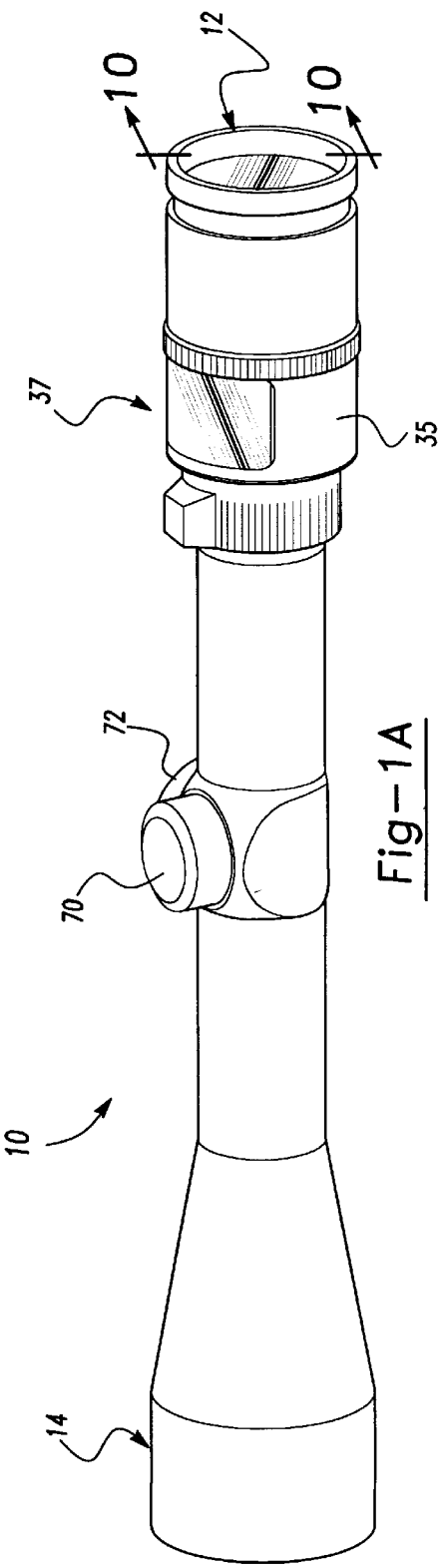

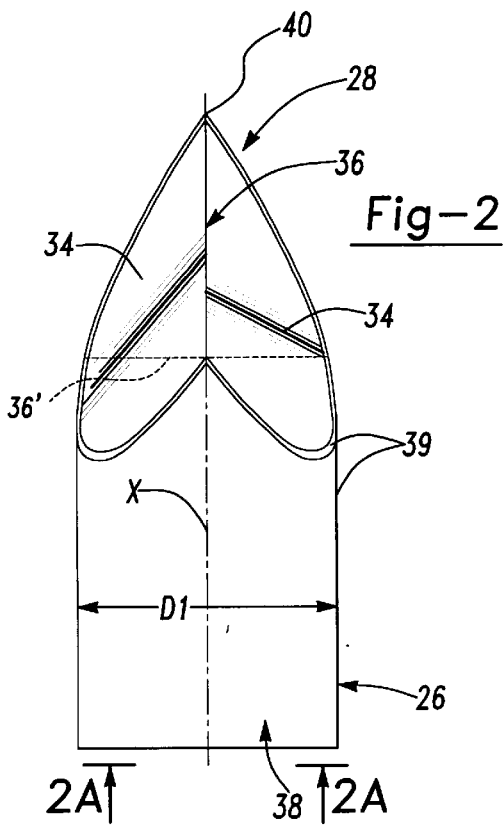
Fig-2
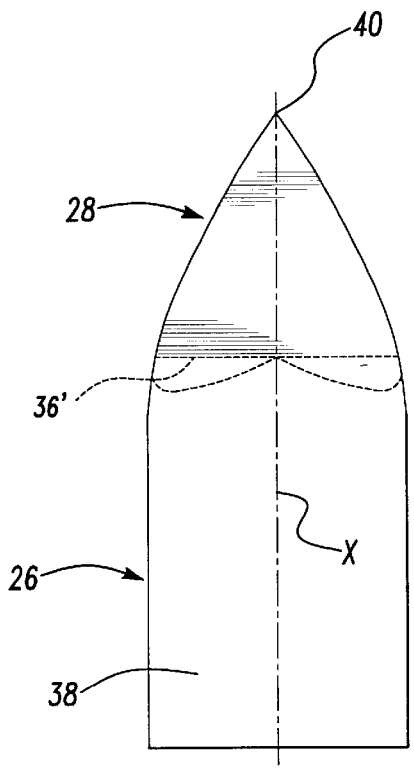
Fig-3
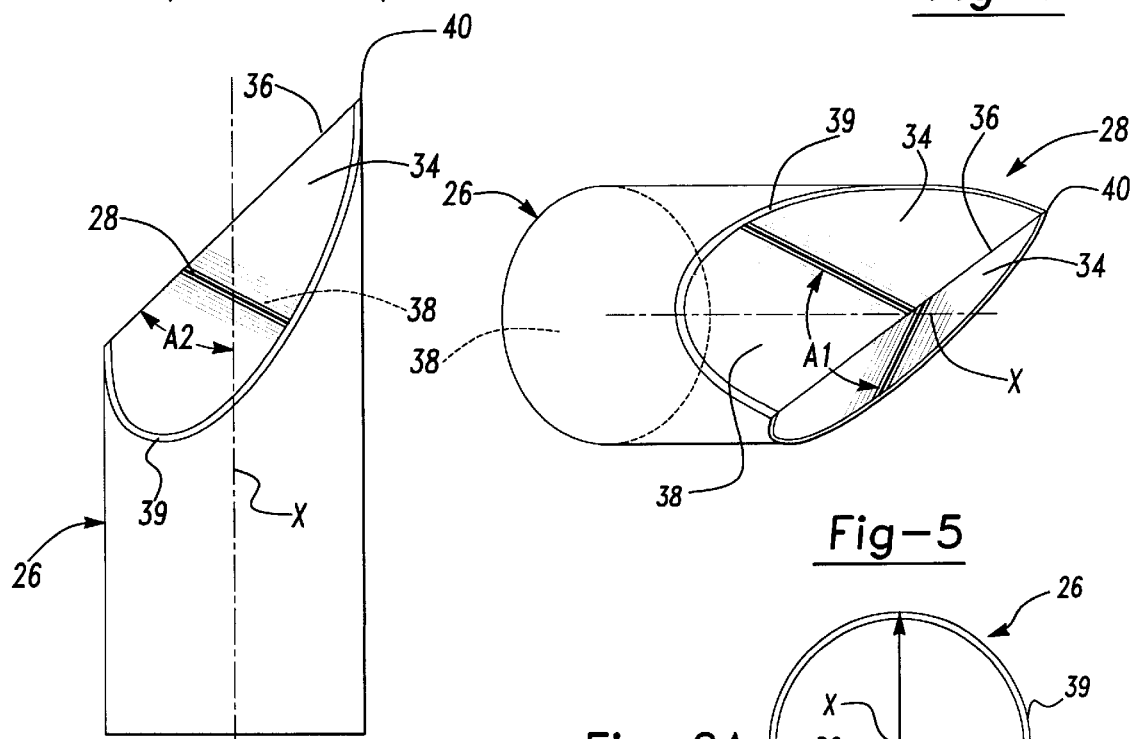
Fig-4
Fig-5
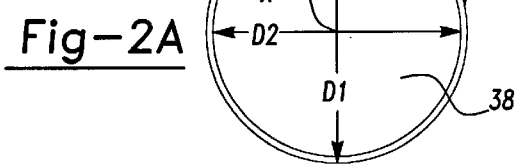
Fig-2A

OPTICAL SIGHTING DEVICE

SUMMARY BACKGROUND OF THE INVENTION

The present invention relates to an optical sighting device and more particularly to an optical sighting device having a sighting post with an illuminated sighting mark or point and to a construction for selectively varying the magnitude of illumination of the sighting mark or point.

Optical sights are well-known and have taken a variety of forms, such as in gun sights and camera view finders. In substantially all forms, however, some type of reticle pattern is utilized to zero in on the area or object of interest. In telescopic gun sights the usual reticle is defined by black cross hairs. However, camera view finders are usually illuminated. In addition many telescopic gun sights have been made to provide an illuminated reticle. One such form is shown in U.S. Pat. No. 4,806,007 issued Feb. 21, 1989 to Glyn Bindon for Optical Gun Sight. Light or the illuminated image from this reticle pattern is located to be viewed directly through a lens system or through reflection by a mirror or lens system by which the object or field is viewed.

In using sighting devices, for example a telescopic sight for aiming weapons, it has been found that sighting with both eyes open is advantageous. When sighting with both eyes open, the operator has the benefit of binocular vision which increases the field of view, provides depth perception information, increases contrast sensitivity and assists the sense of balance. The assessment of the speed and direction of moving objects is also more accurate.

One of the objectives of the present invention is to improve the aiming speed for the viewer, such as a hunter, while using a telescopic sighting means.

With the present invention the viewer can advantageously keep both eyes open at all times while acquiring the target. In the case of a hunter the rifle is raised to an aiming position with one eye, usually the right eye, viewing the magnified target area through the eyepiece lens. As the weapon is being moved towards the target area, the magnified image becomes blurred because it is moving more rapidly than the view seen by the unmagnified (left) eye. In most cases the brain gives preference to the unmagnified view from the left eye, and this is the perceived image.

However, with a brightly illuminated aiming point of significant size, for about 96% of the population the brain merges this point with the unmagnified scene. The hunter can dynamically perceive where the weapon is pointed while moving toward the desired target. The left eye also has an extremely wide field of view, especially when compared to the narrow, magnified view seen through the telescopic sight with the right eye. This also assists the hunter to coordinate the intended target with the weapon position.

As the weapon approaches the proper position for aiming at the target, the hunter automatically slows down the movement of the weapon and the brain very quickly jumps to the complete magnified view. The hunter then makes the final precise aim for a still target, or adds an appropriate lead for a moving target. When the sighting post is in the usual vertical orientation aiming must take place at the center of the end surface at the top of the post. Prior rifle scopes have made the illuminated mark very small to allow precise aim at the tip of the post. In order for the dynamic aiming function to work with the brain as described above, the illuminated aiming mark must be of sufficient size and brightness so that it can be properly superimposed on the human perception. A small aiming mark from a small end surface on the post can impede this function. On the other hand, a large aiming mark can provide a generally imprecise mark for aiming especially where precision aiming is desired. For example it has been common to provide an aiming mark by truncating or beveling the end of an aiming post made of an optical fiber to define a single reflecting surface having a vertical D shape. With this structure the arcuate portion of the D shape is located at the top of the post and hence defines the top of the aiming mark. In order to utilize this shape as a reasonably effective sighting mark, the size of the D has been made relatively small. This, however, results in a sighting mark of limited brightness whereby it will be faint or imperceptible when viewing different scenes. On the other hand if the size of the D is enlarged to provide greater brightness, such a configuration will provide a large illuminated image which, along with the arcuate top, will result in an imprecise aiming mark which impedes accurate aiming.

In the present invention an aiming post of an optical fiber is used with an illuminated point provided at the end of the post which is of a desired, optimized, shape, size and brightness.

In order to provide an illuminated point which is well defined, the end of the fiber is beveled at selected angles to provide multiple roof surfaces which are connected to define a desirable configuration having a sharp peak or point. Depending upon the structure, one or more of the roof surfaces are then polished. The selected bevel angle, in conjunction with the suitable numerical aperture of the optical fiber, provides an aiming mark which is well defined and with a desired uniform brightness throughout the exit pupil. The terms "numerical aperture" and "exit pupil" are terms well known in the optical art and are further defined below. Thus the simple beveled end of the optical fiber provides an illuminated mark which has an advantageous shape and size. In this regard, it is believed that generally triangularly shaped roof surfaces terminating in a central point or peak provide a desired well defined mark for precise aiming.

Where the optical sight is to be used in situations varying in brightness, it is desirable to provide a generally controlled contrast between the level of brightness of the reticle and that of the target or scene being viewed. However, for day and night sighting, the aiming mark contrast can be inconsistent. For example if the aiming mark or reticle is extremely bright it may be most suitable for aiming at brightly lit target scenes but could be too bright for dimly lit target scenes and, of course, the reverse is also true.

Thus aiming at a dark object in heavy shade can be difficult or inaccurate without a suitable means to improve contrast of the aiming mark or reticle. In the past, numerous ways have been devised whereby the aiming mark brightness can be varied to improve contrast with the target scene, i.e. battery powered LEDs, electric lights, etc. which are controlled manually or electronically.

In the present invention a unique construction is utilized to vary the reticle brightness in proportion to the target scene brightness in day and night sighting including a structure for providing a selectively variable illumination intensity for day sighting whereby a desired contrast relative to that of an artificial light source for night sighting can be attained.

A unique fiber optic structure is utilized in which a fiber optic light collector receives ambient light directed radially inwardly over a selected length of fiber whereby a desired magnitude of light energy can be gathered from ambient light to provide illumination to the reticle. In addition a radio-luminescent source is used in combination with the fiber optic collector resulting in a combined illumination whereby a desired level of illumination can be provided to the reticle over the full range of brightness during day and night sighting. A unique construction for automatically varying reticle brightness in accordance with the brightness of the surrounding area by a combination of ambient light and artificial illumination is shown in U.S. Pat. No. 5,653,034 issued Aug. 5, 1997 to Glyn A. J. Bindon. One facet of the present invention provides a unique variation of that structure by utilizing a fixed level of light from an artificial light source and, in addition, providing a means for the operator to simply, selectively vary the level of ambient light illumination transmitted to the reticle.

Thus it will be seen that the unique features of the present invention provide a significant improvement over other sighting devices including ones as shown and described in the U.S. Pat. No. 2,780,130 issued Feb. 5, 1957 to Mauer, U.S. Pat. No. 3,645,635 issued Feb. 29, 1972 to Steck, U.S. Pat. No. 3,905,708 issued Sep. 16, 1975 to Steck, III, U.S. Pat. No. 3,932,162 issued Jun. 13, 1976 to Blakenship, U.S. Pat. No. 3,938,875 issued Feb. 17, 1976 to Ruder, U.S. Pat. No. 4,030,203 issued Jun. 21, 1977 to Ackerman Jr., U.S. Pat. No. 4,576,451 issued Mar. 18, 1986 to Tominaga, U.S. Pat. No. 4,665,622 issued May 19, 1987 to Idan, U.S. Pat. No. 4,764,011 issued Aug. 16, 1988 to Goldstein, U.S. Pat. No. 4,806,007 issued Feb. 21, 1989 to Bindon and U.S. Pat. No. 4,877,324 issued to Hauri et al.

Thus it is an object of the present invention to provide a unique fiber optic sighting device for telescopic sighting.

It is another object of the present invention to provide a unique fiber optic sighting device with an end surface having a unique contour for providing a well defined mark for the reticle.

It is another object of the present invention to provide a unique sighting device for telescopic sighting with both eyes opened.

It is still another object of the present invention to provide a fiber optical post for a telescopic sighting device with the post having an end surface generally triangularly shaped with a relatively sharp peak at its outer end defining the sighting reticle.

It is a general object of the present invention to provide a telescopic sighting device with an optical fiber post having a unique end surface for providing a reticle with a desired, well defined shape and desired brightness to the viewer.

It is another object of the present invention to provide a unique telescopic sighting device with improved means for illuminating the reticle.

It is still another object of the present invention to provide a unique telescopic sighting device for day and night sighting utilizing a sighting reticle illuminated by an artificial light source in combination with a light collector for collecting ambient light and in which the illumination of the reticle is varied naturally in accordance with the illumination of the target or viewing area and including means by which the level of illumination of the reticle can be further selectively adjusted by varying the amount of illumination from the light collector.

It is still another object of the present invention to provide an illuminated reticle of sufficient size and brightness and of a desired shape to allow the dynamic target acquisition described above and that functions with a zoom telescopic lens system. For example, the prism structure of the U.S. Pat. No. 4,806,007, noted above, provides the dynamic capability in a fixed magnification, but requires a cumbersome and rather expensive construction to achieve a zoom magnification feature and to provide a reticle of desired shape and brightness.

Other objects, features and advantages of the present invention will become apparent from the subsequent description and the appended claims, taken in conjunction with the accompanying drawings, in which:

FIG. 1A is a pictorial view of a typical telescopic sight incorporating the features of the present invention;

FIG. 1B is a general, partial schematic diagram of a side view of the lens system for a telescopic sight of FIG. 1A and including a fiber optic aiming post, with an end surface formed in accordance with the present invention for providing the sighting mark or reticle;

FIG. 2 is a fragmentary, elevational view to enlarged scale of the terminal end of the aiming post of FIG. 1 taken in the direction of the Arrow 2 in FIG. 1B;

FIG. 2A is a view of the aiming post of FIG. 2 taken in the direction of the Arrows 2A in FIG. 2 and illustrating the substantially circular cross-section of the fiber of the fiber optic aiming post;

FIG. 3 is a fragmentary view similar to that of FIG. 2 but taken in the direction of the Arrow 3 in FIG. 1B;

FIG. 4 is a side elevational view of the terminal end for the aiming post of FIGS. 2 and 3 as viewed into the plane of the paper of the drawing of FIG. 1B;

FIG. 5 is a top, pictorial view of the terminal end of the sighting post of FIGS. 2–4;

DETAILED DESCRIPTION OF EMBODIMENTS OF THE INVENTION

Figure 6:
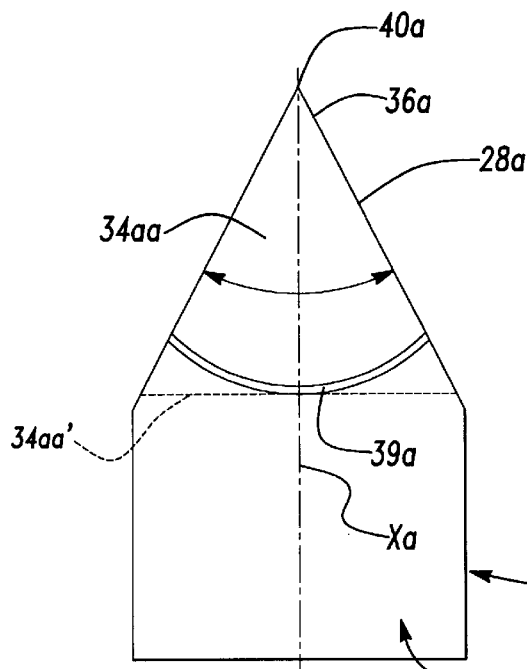
FIG. 6 is a view similar to that of FIG. 2, in the direction of the Arrow 2 in FIG. 1B, of a modified terminal end of the sighting post of FIG. 1B.

Looking now to the schematic drawing of FIG. 1B, a telescopic sight or scope 10 is generally shown and has an overall lens system which includes an eye or ocular lens assembly 12, an objective lens 14, a field lens 19, and an image erection lens assembly 16. The ocular lens assembly 12, includes a doublet ocular lens 15 and a singlet eyepiece lens 17 which are typically closely spaced as shown. The objective lens 14 is a doublet lens as shown in FIG. 1B. The image erection lens assembly 16 includes doublet lenses 18 and 20 which can be set at a fixed spacing to provide a generally fixed magnification or can be supported to be moved in coordination relatively to each other to provide a zoom magnification of the target scene. The overall lens system of the scope 10 also includes a field lens 19 which is located between the image erection lens assembly 16 and the objective lens 14 to generally flatten the field being viewed by the observer to thereby counteract the transmission of field curvature to the observer. The overall lens system and lenses noted above can be of generally known constructions, the specific details of which do not constitute a part of this invention, and hence such details have been omitted for purposes of simplicity. In this regard an example of such overall telescopic constructions is generally shown and described in U.S. Pat. No. 4,576,451 issued Mar. 18, 1986 to Katsuya Tominaga for "Aiming Telescope".

Looking to FIG. 1B the lines shown through the various lenses are directed to the eye 24 of the observer and represent light entering at an angle of 2° below the axis Xo of the objective lens 14 while set at a magnification of 5× and reaching the eye 24. At 5× magnification the observer would look downward at an angle of about 10° to see the target scene which is 2° below the axis Xo. This is typical for a telescopic sight 10 of the type noted above and in which the present invention has been incorporated.

The above described lens system and lenses define a first or objective Image Focal Plane A and a second or ocular Image Focal Plane B.

The objective lens 14 in combination with the image erection lenses 18 and 20 focus the object being viewed onto the Image Focal Plane B. At the same time the ocular lens assembly 12 is located relative to the Focal Plane B to provide a magnified representation of the object being viewed by the eye 24 of the observer. An aiming or sighting post 26, made of a fiber optic material, is located in the Focal Plane B and has its terminal end 28 substantially at the focal point 30. The terminal end 28 of the sighting post 26 is provided with a shape, to be described, to provide a well defined illuminated reticle pattern of a desired size and shape to assist the viewer in aiming the telescopic sight 10 and the associated device, such as a rifle. Illumination for the aiming post 26 can be provided by an artificial light source 32, such as a tritium lamp, which can be connected with the aiming post 26 at a convenient location generally as shown in FIG. 1B. In addition further illumination for the aiming post 26 can be provided from ambient light by a light collector assembly 33. The sighting post 26 can be located at the Image Focal Plane B regardless of whether the scope 10 is of a fixed magnification type or a variable magnification type as with a zoom system.

As noted the first Image Focal Plane A is located between the objective lens 14 and the field lens 19. Thus alternatively the aiming post 26 could be located at the Image Focal Plane A. However, this would usually be done where the lens system for the scope 10 would be of a fixed magnification. Where a variable magnification, as by a zoom system, is provided, then the aiming post 26 would preferably be located at the Image Focal Plane B as shown. In this way the size of the reticle as viewed by the observer will not vary with variations in the magnification of the field of view by the zoom system.

As noted, the terminal end 28 of the aiming post 26 is provided with a beveled, triangular configuration with a peak or point at its upper end to provide a reticle of the desired size and shape. One form of such configuration is shown in FIGS. 2–5. In the configuration shown, the optic fiber of the aiming post 26 is a cladded fiber and has a plastic, fiber core 38 with an outer cladding 39. As can be seen in FIG. 2A, the optic fiber of the aiming post 26 is of a substantially circular cross-section. The upper terminal end 28 is truncated to provide two generally triangularly or semi-elliptically shaped, planar roof surfaces 34 which are inclined relatively to each other to define an inverted V shape at an included angle A1 of 90°, which angle is preferably precisely maintained. In the embodiment of FIGS. 2–5, the two roof surfaces 34 are joined at a central truncation line 36 which is inclined at an angle A2 of between around 45° and 49° to the axis X of the plastic core 38. However an angle A2 of 47° is believed preferable. The apices of the roof surfaces 34 are joined at the upper end of the truncation line 36 to define a sharp peak or point 40. The roof surfaces 34 are polished to a substantially mirror like finish to provide as much internal reflection as possible. Thus with the configuration noted, the roof surfaces 34 will reflect a substantial portion of the light carried by the fiber. The noted configuration is selected in accordance with the refractive index and other characteristics of the plastic material of the core 38 as noted below. However, the selected configuration is generally insensitive to the typical plastic or glass fibers available to the industry.

One form of the invention utilized the following optical fiber dimensioned as noted: Plastic Mitsubishi ESKA SH-1001, acrylic PMMA, diameter D2 of core 38 of 0.0094 inches (0.240 mm), refractive index 1.492, Fluoropolymer outer cladding 39 of diameter D1 of 0.0098 inches (0.250 mm), index 1.417, 0.0394 inches (1.00 mm) diameter black polyethylene buffer. Numerical aperture around 0.47. Acceptance angle around 56°. The latter two terms are defined below.

Another form of the invention utilized the following optical fiber. Optectron clear polystyrene PS0250, diameter D2 of core 38 of 0.0094 inches (0.240 mm), refractive index of 1.592, Fluoropolymer outer cladding 39 of diameter D1 of 0.0098 inches (0.0250 mm) index 1.416, 0.037 inches (0.94 mm) black polyethylene buffer. Numerical aperture around 0.73. Acceptance angle around 93°. The latter two terms are defined below.

It is believed that a reticle of advantageous shape, size and brightness would be obtained with the above constructions where the diameter D2 of core 38 was between around 0.0079 inches (0.200 mm) to around 0.0118 inches (0.300 mm).

In this regard the size of the optical fiber was specifically selected to provide sufficient stiffness to withstand recoil of a rifle and other jarring actions on the scope 10. In prior constructions where the optical fiber was utilized as the sighting post, fine fibers of minimal cross section were used and required the use of metal cross-hairs for support; yet the presence of such metal cross-hairs impedes the effectiveness of two-eye-open sighting as noted above.

In a typical zoom telescope 3–9×40 the exit pupil diameter varies from 0.524 inches (13.3 mm) to 0.173 inches (4.4 mm). The largest exit pupil is at the lowest magnification. The human eye has an entrance pupil of about 0.118 inches (3 mm) diameter in daylight. Thus the eye could be decentered by as much as 0.205 inches (5.2 mm) in the largest exit pupil. It is very important that the aiming mark not become dim when the eye is decentered in the exit pupil. Further, to allow for manufacturing tolerances a factor of safety of two should be applied. For a typical eye relief of 2.756 inches (70 mm) the angle subtended is about 8°. In this regard the numerical aperture of the optical fiber is selected to provide a desired brightness throughout the exit pupil.

The corresponding Field of View for the example above is 6.45° at 3× magnification and 2.15° at 9× magnification.

The term "exit pupil" is a well known term in the optical art and refers to the ratio of the effective diameter of the objective lens 14 to the overall magnification of the lens systems. Thus, for example, where the objective lens 14 has a diameter of 1.575 inches (40 mm) and the lens system has an overall magnification of 5 the resulting exit pupil will be 0.315 inches (8 mm) in diameter.

The term "numerical aperture" (N.A.) is also a well known term in the optical art and is defined by the formula:

$$N.A. = \sqrt{n_1^2 - n_2^2}$$

Where: $n_1$ is the refractive index of the core 38 and $n_2$ is the refractive index of the cladding 39.

The term "acceptance angle", another well known term in the optical art, is an angular equivalent of the term "numerical aperture" defined by the formula: acceptance angle =2 (arc sine N.A.). Thus a fiber with an acceptance angle of about 56° is more than adequate. An angle of ±8° corresponds to a 16° included angle which is much less than the 56° angle provided. However, in a prior art system like that of the U.S. Pat. No. 4,576,451 (supra) the illumination source is located 0.354 inches (9 mm) from the central reflector. With ±8° at 0.354 inches (9 mm) distance, a light source diameter of 0.098 inches (2.5 mm) is required which is about 10 times the diameter of the optical fiber system in the present invention, which is about 100 times more optical power than required.

The size and brightness of the aiming mark must be selected to provide a desired contrast ratio to facilitate the two-eye-open dynamic aiming described above. Based upon experimentation, it is believed that the optimum contrast ratio is about 200:1. The contrast ratio will vary from about 20:1 to about 500:1 for a non-variable fluorescent fiber optic collector. Thus the variable shutter of the present invention, to be described, for varying the intensity of the light transmitted to the fiber optic reticle, can easily provide the optimum contrast ratio.

The core 38 is transparent with the cladding 39 also being transparent so that the light can pass through both the core 38 and cladding 39. However, since the refractive indices of the core 38 and cladding 39 are different, the light rays below the acceptance angle, as they pass axially through the fiber, will be reflected totally back into the core 38 by Total Internal Reflection (known in the trade as T.I.R.) until the light reaches the roof surfaces 34 where it will be reflected substantially transversely to the central axis X and through the ocular lens assembly 12 towards the viewer's eye 24.

Thus, FIG. 2 shows a view of the terminal end 28 as seen from the front or objective end of the scope 10 in the direction of Arrow 2 in FIG. 1B with the polished roof surfaces 34 facing the objective end. The observer's eye 24, however, will see the terminal end 28 from the back or ocular end of the scope 10 in the direction of the Arrow 3 in FIG. 1B. Since the roof surfaces 34 are polished and angled to reflect most of the light inwardly into the core 38 of the aiming or sighting post 26 the view in the direction of the Arrow 2 from the front of the scope 10 will be somewhat faint through the objective lens 14. However, the viewer will be seeing the terminal end 28 in the direction of the Arrow 3 as depicted in FIG. 3. Here the core 38 and cladding 39 will effectively transmit the light reflected from the roof surfaces 34 to define a substantially sharp, triangularly shaped pointed, illuminated image at the terminal end 28. This will provide then a sharp and well defined bright reticle image of a desired size to the eye 24 of the viewer to enhance aiming of the scope 10 and the associated apparatus such as a rifle. In FIG. 3 the reflection of roof surfaces 34 of the core 38 results in a generally triangular shape as observed in the direction of Arrow 3 are shown by shaded lines. The resultant triangle has a base or bottom edge line 36'. As viewed by the eye 24 the resultant triangle will appear flat or planar.

Although the roof surfaces 34 extend a significant distance beyond the edge line 36', light reflected from the roof surface, portions below the base or bottom edge line 36' do not reflect as seen by the eye 24 in the direction of the Arrow 3 in FIG. 1B. Thus the shaded, triangular area in FIG. 3 as seen by the eye 24 shows a straight base line or bottom edge along line 36' of the triangle rather than the pair of semi-elliptical shapes, which are foreshortened by the effects of refraction, below the edge line 36' as seen in FIG. 2.

Another form of a substantially triangular configuration to provide a reticle of the desired size and shape on a fiber optic aiming or sighting post 26a is shown in FIGS. 6–9. In the description of the embodiment of the aiming post 26a of FIGS. 6–9, components similar to like components in the embodiment of the aiming post 26 of FIGS. 2–5 are given the same numeral designation with the letter postscript "a" or "aa". The aiming post 26a is also constructed of an optic fiber having a circular cross-section as shown in FIG. 2A. Again the optic fiber of the aiming post 26a is a cladded fiber with a cladding 39a and a core 38a of the same size and type of materials as described with the aiming post 26 of the embodiment of FIGS. 2–5. Here, however, the terminal end 28a is provided with three planar roof surfaces including a pair of side roof surfaces 34a which are located on opposite sides of a center roof surface 34aa. The side surfaces 34a are inclined relative to the center roof surface 34aa at an included angle A3 of around 110°. The juncture of side roof surfaces 34a with the center roof surface 34aa each define a truncation line 36a which is inclined at an angle A4 of between around 45° to around 49° to the axis Xa of the plastic core 38a (see FIG. 8). However it is believed that an angle A4 of around 47° is preferred. At the same time the truncation lines 36a are inclined at an angle A3 of around 56° relative to each other. The center roof surface 34aa and side roof surfaces 34a converge along the truncation lines 36a to define a peak or sharp point 40a at the terminal end 28a of the aiming post 26a. This configuration is also selected in accordance with the refractive index and other characteristics of the plastic material of the core 38a. However, as previously noted, the selected configuration is generally insensitive to the typical plastic or glass fibers available to the industry. In one form of the embodiment of FIGS. 6–9 only the center roof surface 34aa is polished to a substantially mirror like finish. This is done to simplify the manufacturing procedure. However, it should be noted that the side roof surfaces 34a could also be similarly polished to a mirror like finish. With the configuration noted, the center roof surface 34aa will reflect the light rays from the optical fiber used back into the core 38a of the aiming post 26a substantially transversely to the central axis X and through the ocular lens assembly 12 towards the viewer's eye 24.

Figure 7:
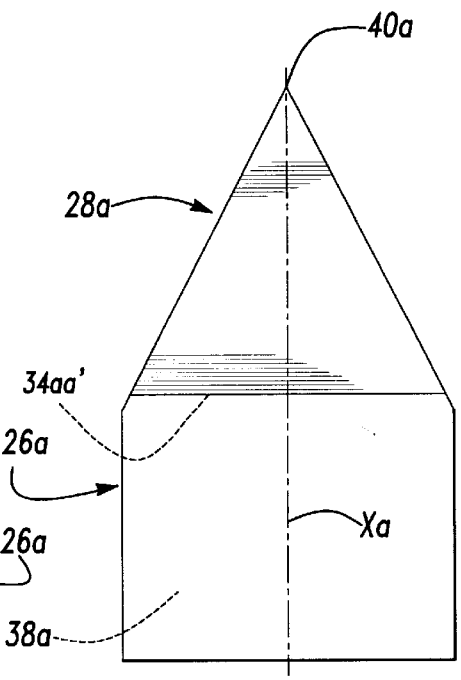
FIG. 7 is a view similar to that of FIG. 3, in the direction of the Arrow 3 in FIG. 1B, of the terminal end of the sighting post of FIG. 6.
Figure 8:
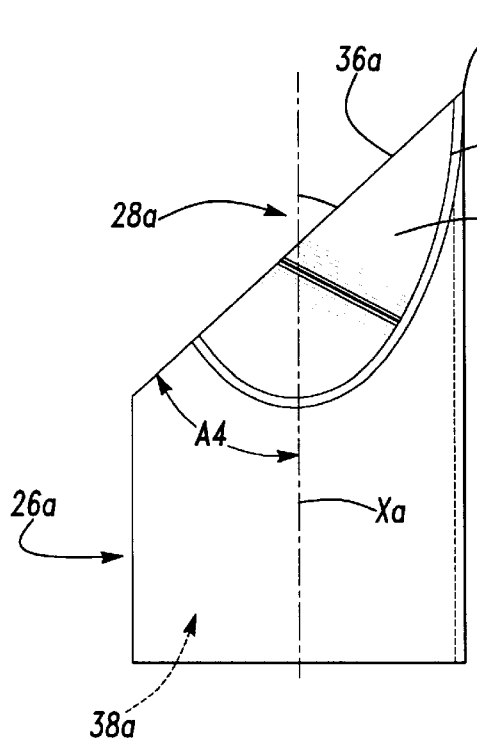
FIG. 8 is a side elevational view, similar to that of FIG. 4, of the terminal end of the sighting post of FIGS. 6 and 7.
Figure 9:
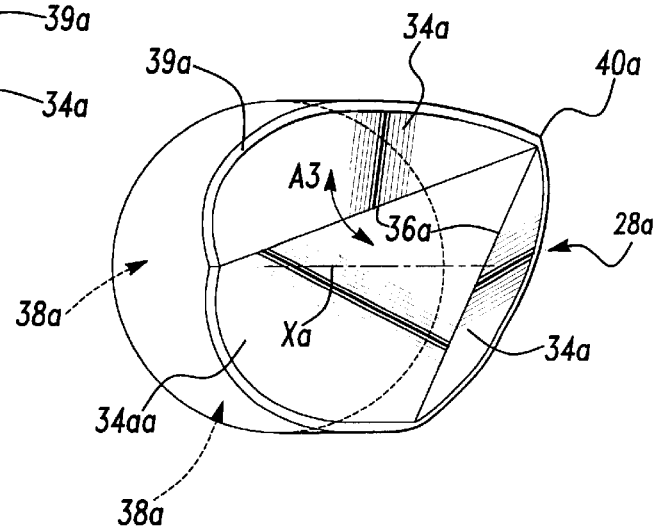
FIG. 9 is a top, pictorial view of the terminal end of the sighting post of FIGS. 6–8.

FIG. 6 shows a view of the terminal end 28a as seen from the front of the scope 10 in the direction of Arrow 2 in FIG. 1B. The observer's eye 24, however, will see the terminal end 28a from the back of the scope 10 in the direction of the Arrow 3 in FIG. 1B. Since the roof surface 34aa is polished and angled to reflect most of the light inwardly into the core 38a of the aiming post 26a, the view in the direction of the Arrow 2 from the front of the scope 10 will be somewhat faint through the objective lens 14. However, the observer will be viewing the terminal end 28a in the direction of the Arrow 3 of FIG. 1B and as depicted in FIG. 7. Here the core 38a and cladding 39a will effectively transmit the light at the roof surface 34aa to define a sharp, substantially triangularly shaped pointed image at the terminal end 28a. This will provide then a well defined, sharp reticle image to the eye 24 of the viewer to enhance aiming of the scope 10 and the associated apparatus such as a rifle. As with FIG. 3, the image of the center roof surface 34aa of the core 38a as viewed by the observer 24 is shown by shaded lines. The lower edge or base line of the illuminated triangle is defined by the end line 34aa' of the polished surface 34aa as shown in FIGS. 6 and 7. Again as viewed by the eye 24 the triangular shape will appear flat or planar.

Figure 10:
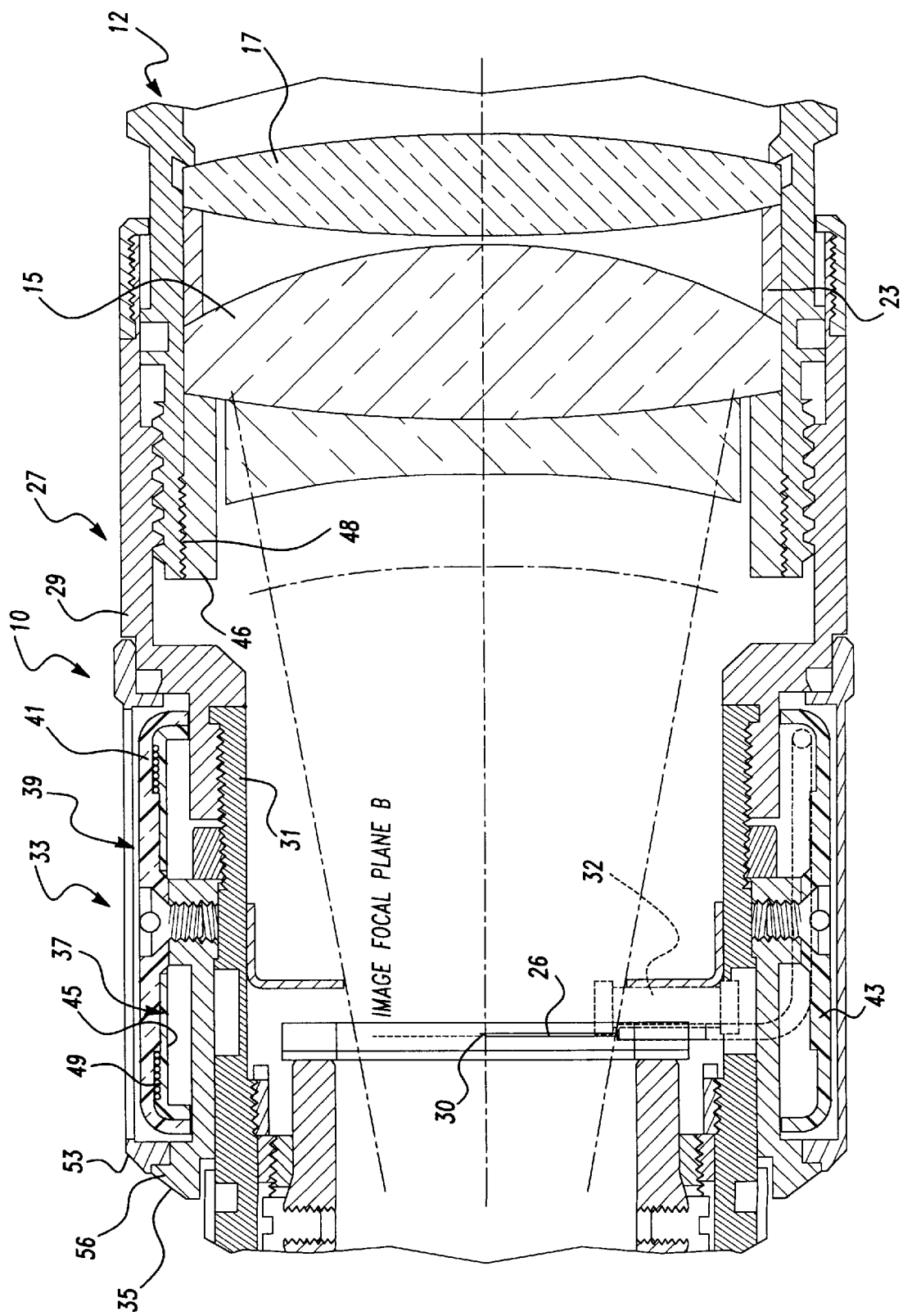
FIG. 10 is a fragmentary, side elevational sectional view of a portion of the telescopic sighting device of FIG. 1A taken generally in the direction of the Arrows 10—10 and including features of the present invention for providing day, ambient light illumination of selectively variable intensity for the sighting post of the present invention.

Looking now to FIG. 10, in conjunction with FIGS. 1A and 1B, the optical gun sight 10 is partially shown and includes a compound housing assembly 27. The ocular lens assembly 16 includes a retaining ring 46 which is threadably secured in a threaded bore portion 48 and clamps the eyepiece lens 17 and the doublet ocular lens 15 together with a spacer ring 23 locating them in a fixed generally closely spaced relationship.

As noted, in one form of the invention the scope 10 includes an artificial light source 32 and a light collector assembly 33. Looking now to FIGS. 10 and 11, the light collector assembly 33 includes a cylindrical mounting ring 35, a light collector structure 37, a two piece cover 25 and a cylindrical light adjustment shutter 51. The collector structure 37 includes a fiber optic collector 49 supported on a semi-cylindrical support member 45 and is designed to gather a significant, predetermined quantity of the available ambient light impinging thereon. The fiber optic collector 49 can be constructed generally along the lines of that as shown in the U.S. Pat. No. 5,653,034 noted above but differs considerably as further described herein. Thus the light collected by the fiber optic collector 49 of the collector structure 37 is transmitted to the sighting post 26 to provide light for the terminal end 28 or 28a to illuminate the reticle image or sighting mark having the desired shape and size as previously described. In addition, further illumination of the reticle image or sighting mark is provided by the artificial light source 32, such as a tritium lamp. The illumination from the light collector assembly 33 is provided primarily for day sighting while the illumination from the artificial source 32 is primarily for sighting in low ambient light conditions such as dawn, dusk or night. Both sources of illumination are applied to the reticle image or sighting mark at the same time. Since it is desired that the level of illumination of the reticle pattern be a function of the level of illumination of the object or scene being viewed through the telescopic sight 10 the magnitude of illumination from the artificial light source 32 will be selected to be considerably less than that from the collector assembly 33. Thus in a bright daylight condition the level of reticle illumination will be determined primarily by the collector assembly 33 while dusk or night illumination will be determined primarily if not solely by the artificial light source 32. In one form of the invention the tritium lamp 32 was of the type T-4734 manufactured and sold by M B Microtec.

As previously noted, it is desirable to have the level of illumination of the reticle image varied in accordance with the level of illumination of the object or scene being viewed while at the same time providing the desired degree of contrast. The level of illumination from the collector assembly 33 will vary naturally in accordance with the daylight illumination of the object or scene being viewed and in this regard will be balanced with a known, fixed level of illumination provided by the artificial light source 32. While the amount of light collected from the collector assembly 33 can be selected to provide an overall desired degree of contrast with the scene being viewed over the full range of luminance of the scene, it is desirable in some instances to provide a means for the operator to be able to selectively vary the amount of ambient light collected to accommodate varying ambient light conditions.

For example, the viewer could be located in a shaded area while the target or scene is located in a brightly lit area and vice versa. Thus the present invention provides a means for the operator to readily vary the amount of light transmitted to the reticle by the collector assembly 33.

As noted the overall construction of the telescopic sight 10 can be of one well known in the telescopic art such as that generally exemplified by the telescopic sight shown in the U.S. Pat. No. 4,576,451 noted above. Thus in FIG. 10 the details of only that portion of a physical embodiment of the telescopic sight 10 is shown and described which has been modified to include the unique collector assembly 33 of the present invention. As noted, however, the lens system of the telescopic sight 10 can be in an overall arrangement generally as shown in U.S. Pat. No. 4,576,451 noted above.

Figure 11:
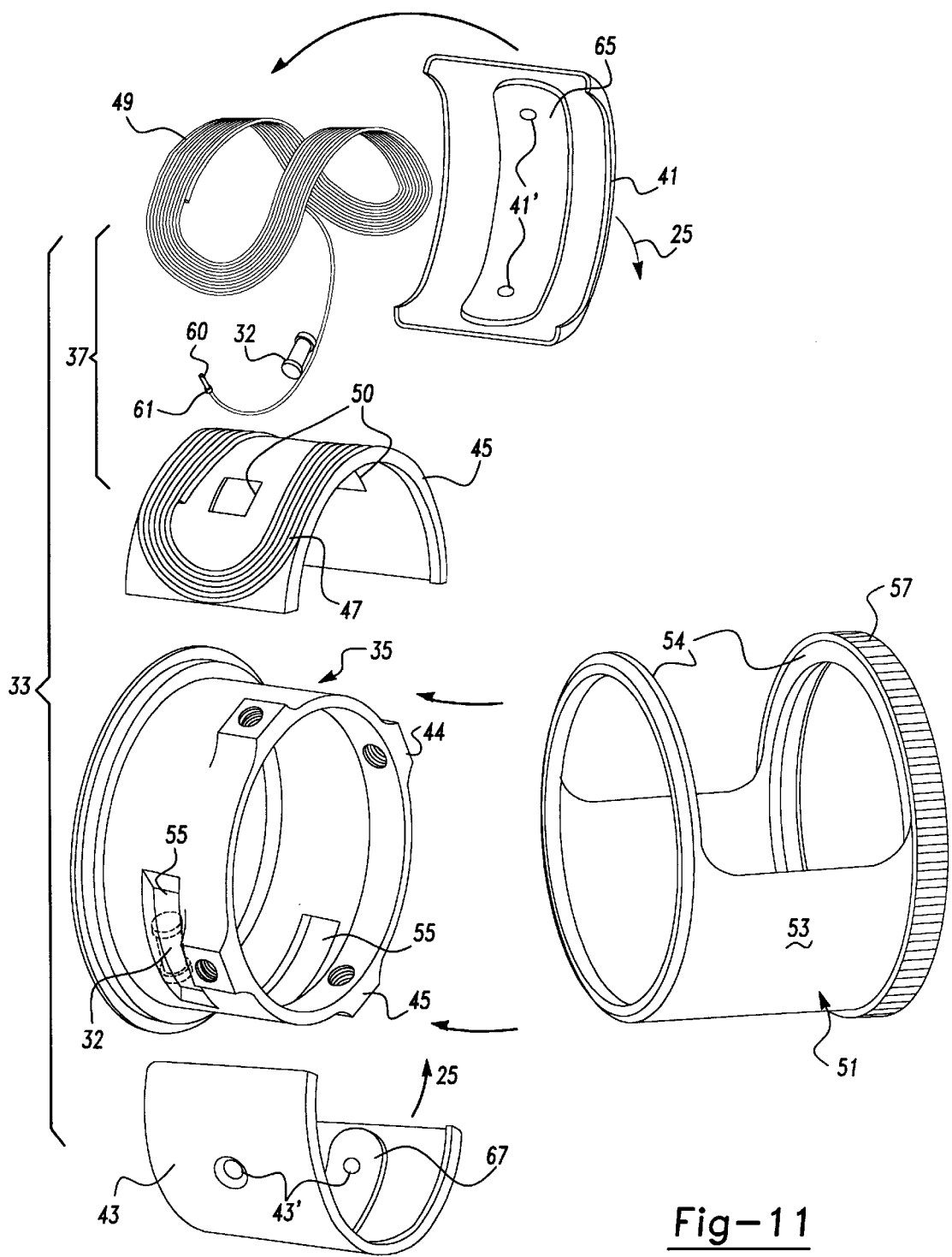
FIG. 11 is an exploded pictorial view of the components of a light collector assembly for providing a selectively adjustable variable intensity from day ambient light as utilized in the sighting device of FIGS. 1A, B and 10.

Looking now to FIGS. 10 and 11, the telescopic sight 10 includes a generally elongated housing assembly 27. The mounting ring 35, which is made of aluminum, is telescopically supported on connected cylinders 29 and 31 of the housing assembly 27 and includes four radially outwardly extending threaded mounting bosses 44 which are equally spaced in quadrature circumferentially about one end of the ring 35. A pair of slots 55 are located adjacent two of the bosses 44. A support flange 56 is located at the opposite end of the ring 35 (see FIGS. 10 and 11).

The light collector structure 37 has a generally semi-cylindrical shape and is supported on the mounting ring 35. The collector structure 37 includes a semi-cylindrically shaped light collector support 45 which is formed with an outer surface having a serpentine like groove 47. The fiber optic collector 49 is formed to a serpentine shape to match the shape of groove 47 on the outer surface of the support 45 (see FIG. 11). In operation then, the fiber optic collector 49 is located in the matching serpentine groove 47 and fixedly supported therein by a suitable transparent potting compound. One such compound is a Dow Corning clear silicon RTV 734 Potting Compound. The support 45 is made of a white, reflective plastic material such as Lexan 2220 White Polycarbonate. The clear potting compound along with the white material of the support 45 will reflect some of the scattered light directed into the fiber optic collector 49.

As noted, the fiber optic collector 49 is arranged in a generally serpentine configuration defined by a series of coils of increasing size. The desired shape of the collector 49 can be preformed by known processes. For example a selected length of generally straight fiber optic material can be formed into the desired serpentine shape by immersing it in water at around 212° F. or 100° C. and then, while in a plastic state, bending it to the desired shape on a suitable mold. When cooled the desired serpentine shape will be maintained. However since the details of that process do not constitute a part of the present invention such details have been omitted for purposes of simplicity.

The support 45 has two generally rectangular openings 50 which are adapted to generally matably receive two of the bosses 44 on the mounting ring 35 to thereby be located and held in a desired position with the collector structure 37 then held on the radially upper side of the housing assembly 27 of the telescopic sight 10. The collector structure 37 is then generally enveloped by the cover 25.

The two piece cylindrical cover 25 comprises an upper semi-cylindrical section 41 and a lower semi-cylindrical section 43 which are substantially identical in shape. The upper section 41 and lower section 43 are secured to the radially extending fastening bosses 44 on the mounting ring 35 by suitable threaded fasteners extending through bores 41' and 43', respectively. The cover sections 41 and 43 overlay the collector structure 37 to generally seal it from the outside and with the upper section 41 then securing the collector structure 37 to the mounting ring 35. The upper and lower sections 41 and 43 have generally smooth, uniform outer surfaces and each are provided with a center rib portion 65 and 67, respectively. In the case of the upper cover section 41 the rib 65 will be nested in the central open area of the fiber optic collector 49 and will be generally seated there against the collector support 45. The upper section 41 is constructed of a generally transparent material and overlays the light collector structure 37 and permits ambient light to be transmitted into the fiber optic collector 49. One such transparent material for upper section 41 is GE Lexan clear polycarbonate OQ2220. On the other hand the lower section 43 is constructed of a black pigmented generally opaque material to block the passage of light for a purpose to be described. One such material is GE Lexan black pigmented polycarbonate 2220.

As noted the variable light shutter 51 is provided to permit the operator to selectively vary the amount of the fiber optic collector 49 which is exposed to ambient light. The light shutter 51, which is constructed of aluminum, is of a generally cylindrical shape and is rotatably mounted on the mounting ring 35 and on another cylindrical member 41 of the housing assembly 27.

Looking now to FIG. 11, the generally cylindrical light shutter 51 has a closed portion 53 and an open or slotted portion 54. Each of the portions 53 and 54 extend for around 180°. A serrated ring 57 is located at one end of the light shutter 51 to facilitate gripping and manipulation by the operator. The light shutter 51 is located circumferentially over the cover 25 and hence over the light collector structure 37 and specifically over the fiber optic collector 49. Thus by rotatably manipulating the light shutter 51 the amount of the fiber optic collector 49 which is exposed to the ambient light can be varied from full exposure when the slot 55 is in full radial alignment with the fiber optic collector 49 to substantially zero exposure when the cover portion 53 is in such radial alignment. In this way the magnitude of the ambient light received by the fiber optic collector 49 can be selectively varied whereby the intensity of the brightness of the triangularly shaped sighting marks defined by the terminal ends 28 and 28a can be varied. It should be noted that the light shutter 51 can be rotated either clockwise or counterclockwise thus giving the operator the choice of blocking certain directional rays of ambient light coming from either side of the sight 10.

As noted the mounting ring 35 is provided with a pair of slots 55. The tritium lamp 32 is located in one of the slots 55 in the mounting ring 35 and at a position behind the opaque lower cover section 43. In this way the tritium lamp 32 is essentially blocked from emanating stray light into the interior of the scope 10 or outwardly from the scope 10. Looking to FIGS. 10 and 11, the tritium lamp 32 and associated one of the slots 55 are shown in phantom in the position occupied as assembled.

The fiber optic collector 49 is optically connected to a separate fiber optic transmission line 60 which can be coupled therewith by way of a standard fiber optic coupling 61. The use of a transmission line 60 separate from the collector 49 serves a purpose to be described. Thus the ambient light captured by the fiber optic collector 49 is transmitted to the aiming post 26, 26a via the fiber optic transmission line 60. The artificial light source 32, such as a tritium lamp, is optically connected to an optic fiber lead from the fiber optic collector 49 and thence through the coupling 61 to transmission line 60 within the housing of the scope 10.

The fiber optic collector 49 is constructed of an optical fiber preferably made with a core portion constructed of a pigmented fluorescent polystyrene material having a refractive index of around 1.592 and with an outer cladding of a clear acrylic material having a refractive index of around 1.492. In another form of the invention the same pigmented fluorescent polystyrene core portion is first covered with a fluoropolymer cladding with a refractive index of around 1.416. The core portion with its cladding is then surrounded with an outer casing of clear polystyrene material. It should be understood that optical fibers of different constructions could be utilized including core portions, of different light activated material.

With the core portion of the optic fiber of the fiber optic collector 49 made of a colored or pigmented fluorescent fiber, the ambient light impinging on the fiber optic collector 49 will excite the fluorescent material to generate light for illuminating the reticle pattern. In one form of the invention the diameter of the core portion of the optic fiber was around 0.0118 inches (0.30 mm) while the major diameter of the optic fiber was around 0.0197 inches (0.50 mm). A suitable fiber material can be generally of the type manufactured and sold by Optectron under the designation F204E. The optical fiber of the transmission line 60 will have slightly smaller dimensions, i.e. around 20% less than that of the fiber optic collector 49.

The fiber optic transmission line 60 is not exposed to ambient light as is the fiber optic collector 49. Instead the transmission line 60 passes in the internal shadow of the main housing of the scope 10. If the core portion of the transmission line 60 were constructed of a pigmented fluorescent material as is the optical fiber of the fiber optic collector 49, then the light traveling through the transmission line 60 in the scope housing could experience some loss in intensity resulting from such fluorescent treatment. Thus in the embodiment of the present invention, the separate transmission line 60 is constructed with a clear core portion whereby such losses are avoided.

In one form of the invention, the optical fiber of the transmission line 60 is constructed of a non pigmented clear acrylic material such as the Plastic Mitsubishi ESKA SH-1001 as previously described.

By the application of calculations through methods known to those skilled in the art, it was determined that a suitable reticle mark size of around 6.2 MOA (minutes of angle) will be subtended on the target or scene being viewed at a magnification of 3×.

At higher magnifications, although the mark remains the same size as presented to the eye during dynamic movement, the target scene enlarges such that for example the mark size is 4.7 MOA at 4×, 3.1 MOA at 6× and 2.1 MOA at 9× magnification.

Thus the illuminated aiming mark is between around 1.28% to around 1.92% of the Field of View mentioned above. However, around 1.6% of the Field of View is believed preferable. This percentage is constant regardless of the zoom setting.

As noted, the coils of the fiber optic collector 49, are generally circumferentially arranged over a 180° arcuate plane. This arrangement responds to the light emanating from somewhat different directions in the area of the target or scene to be viewed and from the location of the operator.

In one form of the invention the length of the serpentine portion of the fiber optic collector 49, which can be fully exposed to ambient light was around 39 inches (100 cm).

In addition to providing a desired contrast in intensity between the brightness of the reticle and that of the viewed image or target, a contrast in color is also desirable. It is believed that for day and night sighting a reticle pattern having an amber or red hue is advantageous. Thus in one form of the present invention the optical fiber of the core of the fiber optic collector 49 was treated with a yellow fluorescent material which resulted in a reflected reticle pattern of an amber hue for day sighting. At the same time the tritium lamp 32, having a green hue, causes, by fluorescence from the optical fiber of the core of the fiber optic collector 49, the same amber color to appear in the reticle as viewed at night. Thus for day or night sighting the fiber optic collector 49 will provide a reflected reticle pattern having an amber hue or alternatively a red hue if a red fluorescent fiber is used. For night sighting, with substantially no daylight illumination on the fiber optic collector 49, the reticle pattern will still have an amber or red hue as noted above.

The objective lens 14 and ocular lens assembly 12 can be selected to provide a telescopic effect with selected magnification ratios over a wide range; thus, it should be noted that the principles of the present invention are readily applicable to optical sights of different magnification ratios, including zero magnification.

It should be noted that the unique construction of the sighting posts of FIGS. 3–9 can be used with different scope or sighting constructions and can be effectively used where the only source of illumination for the sighting post is from an artificial source such as artificial source 32.

It should also be understood that the scope 10 can have numerous structures not necessary for the features of the present invention. For example the scope 10 when used with a rifle can have means for adjustment for elevation via a mechanism actuated by knob 70 and windage via a mechanism actuated by knob 72. Such features, of course, not being a part of the present invention have been omitted for purposes of simplicity.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A sighting device for day and night use for viewing a scene or object along a sighting axis, comprising:

reticle structure means for providing a reticle pattern for use in aiming said sighting device, a first source of light being a means for receiving ambient light;

a second source of light being a source of artificial light;

said first source of light comprising light collector means including a fiber optic light collector defined by an optical fiber having a preselected length and adapted to receive ambient light directed radially inwardly into said optical fiber over said preselected length to provide a determinable level of illumination to said reticle structure means for providing a desired level of brightness for said reticle pattern for a desired contrast with the level of illumination of the image or object being viewed;

said reticle structure means comprising a fiber optic line operatively connected with said fiber optic light collector, said fiber optic line having a light emitting end at which said reticle pattern is defined, said fiber optic light collector providing illumination to said light emitting end of said fiber optic line;

fiber optic means connected with said first and second source of light for providing illumination to said light emitting end of said fiber optic line;

shutter means operatively connected with said first source of light and being operable to selectively block said fiber optic light collector more or less from the ambient light whereby the brightness of said reticle pattern defined at said light emitting end can be varied.

2. The sighting device of claim 1 with said shutter means comprising a movable member being movably supported relative to said fiber optic light collector for movement to positions ranging from blocking to not blocking said fiber optic light collector from the ambient light.

3. The sighting device of claim 1 with said light emitting end of said fiber optic line substantially defining the shape of said reticle pattern.

4. The sighting device of claim 1 with said source of artificial light being a radio-luminescent source.

5. The sighting device of claim 1 with said optical fiber of said fiber optic light collector having a core portion and an outer cladding, said core portion including a light activated material to provide illumination in response to the ambient light, said cladding being generally transparent to permit ambient light to pass radially therethrough to impinge upon the light activated material of said core portion.

6. A sighting device for day and night use for viewing a scene or object, comprising:

reticle structure means for providing a reticle pattern for use in aiming said sighting device, first light source means for receiving ambient light and for providing illumination from the ambient light to said reticle structure means for illuminating said reticle pattern;

second light source means comprising an artificial light source and for providing illumination from said artificial light source to said reticle structure means for illuminating said reticle pattern;

said first light source means comprising a fiber optic light collector defined by a first optical fiber having a preselected length and adapted to receive light directed radially inwardly into said first optical fiber over said preselected length to provide a determinable level of illumination to said reticle structure means for providing a desired level of brightness for said reticle pattern for a desired contrast with the level of illumination of the image or object being viewed;

fiber optic means operatively connected with said first and second light source means for transmitting the light obtained from said fiber optic light collector and from said artificial light source to said reticle structure means, said fiber optic light collector being defined by a generally serpentine arrangement of said first optical fiber being generally semi-cylindrically shaped and located in a generally arcuate plane whereby said fiber optic light collector can receive said ambient light from a relatively wide angular range.

7. The sighting device of claim 6 with said fiber optic light collector being supported to face generally vertically upwardly.

8. The sighting device of claim 6 further comprising shutter means operatively connected with said first source of light and being operable to selectively block said fiber optic light collector more or less from said ambient light whereby the brightness of said reticle pattern can be varied.

9. The sighting device of claim 6 with said first light source means comprising a retainer having a groove structure with a serpentine shape generally matching said serpentine arrangement of said first optical fiber and adapted to matingly receive said first optical fiber and to support said first optical fiber to retain said serpentine arrangement.

10. The sighting device of claim 6 with said first light source means comprising a retainer having a groove structure with a serpentine shape generally matching said serpentine arrangement of said first optical fiber and adapted to matingly receive said first optical fiber and to support said first optical fiber to retain said serpentine arrangement, said retainer having a reflective surface in confrontation with said first optical fiber for reflecting light into said first optical fiber.

11. The sighting device of claim 6 with said fiber optic means comprising a second optical fiber having a light emitting end, said light emitting end of said second optical fiber substantially defining the shape of said reticle pattern.

12. In a sighting device for device for directly viewing by an observer a scene or object by eye of the observer and having a reticle structure for providing a reticle pattern for use in viewing the scene or object, a source of light for illuminating the reticle pattern, comprising:

ambient light source means for receiving ambient light and for providing illumination from the ambient light to the reticle structure for illuminating the reticle pattern;

said ambient light source means comprising a fiber optic light collector defined by a first optical fiber constructed of a light activated material for providing illumination in response to light incident thereon, said first optical fiber having a preselected length and adapted to receive light directed radially inwardly into said first optical fiber over said preselected length to provide a determinable level of illumination for the reticle structure for providing a desired level of brightness for said reticle pattern, shutter means operatively connected with said fiber optic light collector and being manually operable by the observer to selectively block said fiber optic light collector more or less from the ambient light whereby the brightness of the reticle pattern as seen by the eye of the observer can be varied.

13. The sighting device of claim 12 with said fiber optic light collector being defined by a generally serpentine arrangement of said first optical fiber and located in a generally arcuate plane.

14. The sighting device of claim 13 with said ambient light source means comprising a retainer having a groove structure with a serpentine shape generally matching said serpentine arrangement of said first optical fiber and adapted to matingly receive said first optical fiber and to support said first optical fiber to retain said serpentine arrangement.

15. The sighting device of claim 13 with said ambient light source means comprising a retainer having a groove structure with a serpentine shape generally matching said serpentine arrangement of said first optical fiber and adapted to matingly receive said first optical fiber and to support said first optical fiber to retain said serpentine arrangement, said retainer having a reflective surface in confrontation with said first optical fiber for reflecting light into said first optical fiber.

16. A sighting device for directly viewing by an observer a scene or object by eye of the observer along a sighting axis, as for use in aiming a rifle, said sighting device comprising:

a fiber optic sighting post having a reticle structure at its terminating end located at a preselected position along the sighting axis, said reticle structure defined by at least two intersecting planar roof surfaces inclined at a preselected angle to define a reticle pattern, lighting means connected to said sighting post for illuminating said reticle pattern, at least one of said planar roof surfaces being polished to a generally mirror like finish and operable at said preselected angle to reflect light from said reticle pattern towards the eye of the observer, said reticle pattern providing a generally triangular shape with a substantially pointed end whereby a well defined aiming point is provided.

17. The sighting device of claim 16 with said reticle structure having two planar surfaces joined at a centrally located truncation line.

18. The sighting device of claim 16 with said reticle structure having three planar surfaces including a center surface and two side surfaces with each of the side surfaces joined to said center surface along a connecting truncation line.

19. A telescopic sighting device for day and night use for viewing a scene or object, as for use with a rifle, comprising:

a lens system defining an image focal plane, said lens system having a sighting axis extending centrally through said lens system and said focal plane, reticle structure means for providing a reticle pattern for use in aiming said sighting device and for locating said reticle pattern along said sighting axis and in said focal plane, first light source means for receiving ambient light and for providing illumination from the ambient light to said reticle structure means for illuminating said reticle pattern;

second light source means comprising an artificial light source and for providing illumination from said artificial light source to said reticle structure means for illuminating said reticle pattern;

said first light source means comprising a fiber optic light collector defined by a first optical fiber having a preselected length and adapted to receive light directed radially inwardly into said first optical fiber over said preselected length to provide a determinable level of illumination to said reticle structure means for providing a desired level of brightness for said reticle pattern for a desired contrast with the level of illumination of the image or object being viewed;

attachment means for locating said fiber optic light collector to face generally vertically upwardly when the sighting axis is generally horizontally oriented, fiber optic means operatively connected with said first and second light source means for transmitting the light obtained from said fiber optic light collector and from said artificial light source to said reticle structure means, said fiber optic light collector being defined by a generally serpentine arrangement of said first optical fiber being generally semi-cylindrically shaped and located in a generally arcuate plane whereby said fiber optic light collector can receive ambient light from a relatively wide angular range, shutter means operatively connected with said first source of light and being operable to selectively block said fiber optic light collector more or less from ambient light whereby the brightness of the reticle pattern can be varied.

20. The sighting device of claim 19 with said shutter means comprising a cylindrical member having a closed section and an open section and being rotatably supported over said fiber optic light collector whereby said cylindrical member can be rotated relative to said fiber optic light collector to selectively move said closed and open sections over said fiber optic light collector to control the amount of ambient light received by said fiber optic light collector.

21. The sighting device of claim 20 with said fiber optic collector extending arcuately for generally around 180°, said closed and open sections being diametrically opposed with each extending arcuately for generally around 180°.

22. A sighting device for directly viewing by an observer a scene or object by eye of the observer along a sighting axis, as for use in aiming a rifle, said sighting device comprising:

a fiber optic sighting post being made of an optical fiber having a generally circular cross-section with a central axis, said sighting post having a reticle structure at its terminating end located at a preselected position along said sighting axis, said reticle structure defined by two intersecting planar roof surfaces inclined at a preselected angle to define a reticle pattern, and joined at a centrally located truncation line, lighting means connected to said sighting post for illuminating said reticle pattern, at least one of said planar roof surfaces being polished to a generally mirror like finish and operable at said preselected angle to reflect light from said reticle pattern towards the eye of the observer, said reticle pattern providing a generally triangular shape with a substantially pointed end whereby a well defined aiming point is provided, said planar surfaces being inclined relative to each other along said truncation line at an angle of 90°, said truncation line being inclined relative to said central axis at an angle of between around 45° to around 49°.

23. The sighting device of claim 22 with said angle of inclination of said truncation line to said central axis being 47°.

24. The sighting device of claim 22 with said optical fiber having a core and an outer cladding of different refractive indeces whereby light traveling therethrough along said central axis will be reflected into said core until it reaches said planar surfaces at which the light will be reflected from said roof surfaces in a direction transversely to said central axis.

25. The sighting device of claim 24 with said core had a diameter of between around 0.0079 inches to around 0.0118 inches.

26. A sighting device for day and night use for viewing a scene or object along a sighting axis, comprising:

reticle structure means for providing a reticle pattern for use in aiming said sighting device, a first source of light being a means for receiving ambient light;

a second source of light being a source of artificial light;

said first source of light comprising light collector means including a fiber optic light collector defined by an optical fiber having a preselected length and adapted to receive ambient light directed radially inwardly into said optical fiber over said preselected length to provide a determinable level of illumination to said reticle structure means for providing a desired level of brightness for said reticle pattern for a desired contrast with the level of illumination of the image or object being viewed;

said reticle structure means comprising a fiber optic sighting post having a reticle structure defining said reticle pattern at the terminating end of said sighting post located at a preselected position along the sighting axis, said reticle structure defined by a plurality of intersecting planar roof surfaces inclined at a preselected angle to define said reticle pattern, said fiber optic light collector providing illumination to said sighting post for illuminating said reticle pattern, fiber optic means connected with said first and second source of light for providing illumination to said sighting post, at least one of said planar roof surfaces being polished to a generally mirror like finish and operable at said preselected angle to reflect light from said reticle pattern towards the eye of the observer, said reticle pattern providing a generally triangular shape with a substantially pointed end whereby a well defined aiming point is provided, shutter means operatively connected with said first source of light and being operable to selectively block said fiber optic light collector more or less from the ambient light whereby the brightness of the reticle pattern can be varied.

27. The sighting device of claim 26 with said plurality of intersecting roof surfaces comprising two planar surfaces joined at a centrally located truncation line.

28. The sighting device of claim 26 with said plurality of intersecting roof surfaces comprising three planar surfaces including a center surface and two side surfaces with each of the side surfaces joined to said center surface along a connecting truncation line.

29. A sighting device for directly viewing by an observer a scene or object by eye of the observer along a sighting axis, as for use in aiming a rifle, said sighting device comprising:

a fiber optic sighting post being made of an optical fiber having a generally circular cross-section with a central axis, said sighting post having a reticle structure at its terminating end located at a preselected position along the sighting axis, said reticle structure defined by three intersecting planar roof surfaces inclined at preselected angles to define a reticle pattern and including a center surface and two side surfaces with each side surface joined to said center surface at a truncation line, lighting means connected to said sighting post for illuminating said reticle pattern, at least one of said planar roof surfaces being polished to a generally mirror like finish and operable at said preselected angle to reflect light from said reticle pattern towards the eye of the observer, said reticle pattern providing a generally triangular shape with a substantially pointed end whereby a well defined aiming point is provided, said side planar surfaces being inclined relative to said center planar surface along said truncation line at an angle of around 110°, said truncation line being inclined relative to said central axis at an angle of between around 45° to around 49°.

30. The sighting device of claim 29 with said angle of inclination of said truncation line to said central axis being 47°.

31. The sighting device of claim 29 with said optical fiber having a core and an outer cladding of different refractive indeces whereby light traveling therethrough along said central axis will be reflected into said core until it reaches said planar surfaces at which the light will be reflected from said roof surfaces in a direction transversely to said central axis.

32. The sighting device of claim 31 with said core had a diameter of between around 0.0079 inches to around 0.0118 inches.

* * * * *